Dec. 20, 1938.    J. A. STEFAN    2,140,724
SINKER
Filed Dec. 23, 1937

Inventor
Joseph A. Stefan

By Clarence A. O'Brien
Hyman Berman
Attorneys

Patented Dec. 20, 1938

2,140,724

UNITED STATES PATENT OFFICE 2,140,724

SINKER

Joseph A. Stefan, Comstock, N. Y.

Application December 23, 1937, Serial No. 181,401

3 Claims. (Cl. 43—52)

This invention relates to fishing line sinkers and an object of the invention is to provide a sinker which may be slidably mounted on the fishing line in a manner to permit the fishing line to slide freely therethrough when pulled or tugged on by a fish attempting to get the bait on the hook.

An objection to the present type of sinkers, which latter are usually positively secured to the line in some manner, is that when the fish, in attempting to get the bait from the hook, take note of a pull resisting their efforts are apt to desist in their further efforts to obtain the bait. With a sinker embodying the features of the present invention such resistance will not be offered to the fish, and at the same time the fisherman will be immediately apprised of the pull by the fish on the line and will consequently be more apt to hook the fish.

Further in accordance with the present invention the sinker is of such a shape and size as to readily accommodate and thereby serve as a guard for the fish hook when the line is not in use.

Figure 1:
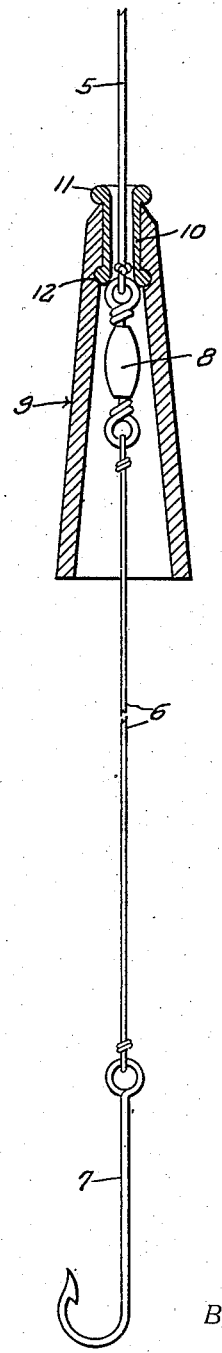
Figure 2:
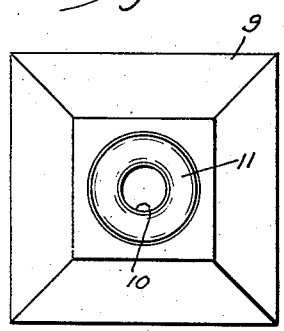

The invention together with its objects and advantages will be best understood from a study of the following description taken in connection with the accompanying drawing wherein:

Fig. 1 is a longitudinal sectional view through the sinker illustrating the application of the same to a fish line, and Fig. 2 is an end elevational view of the sinker.

Referring to the drawing by reference numerals it will be seen that 5 indicates an end portion of a fish line, 6 a leader line, 7 a hook on one end of the leader line 6, and 8 a swivel connecting the leader line to the end 5 of the fish line.

My improved sinker is indicated by the reference numeral 9 and in the present instance is shown as being formed of lead or other suitable material. The sinker 9 is hollow, elongated and of substantially pyramidal shape, and molded into the body of the sinker at the smallest end of the latter is a metallic ferrule 10 through which the line 5 is trained.

At the opposite ends thereof the ferrule is provided with beads 11 and 12 which beads provide therebetween a peripheral groove receiving therein a portion of the material from which the sinker 9 is molded thereby insuring a positive connection between the ferrule and the sinker. Also the beads 11 and 12 effectively reinforce the sleeve 10 at the ends of the latter and the inner bead 12 provides an effective stop engageable with the swivel 8 so as to limit the movement of the sinker 9 in the direction of the hook 7.

It will thus be seen that with a sinker of this character the latter will permit the line to slide freely longitudinally through the sinker so that when the fish bites and draws upon the line the swivel 8 will move through the sinker freely and permit the fish to draw sharply upon the line. Also, the line being freely movable relative to the sinker the fisherman, by simply drawing upon the line from time to time may readily tell whether his bait is right or not or whether a fish is actually nibbling at the bait.

Also when the line is not in use the shank 7 of the hook may be positioned within the bore of the sinker 9 with the pointed end of the hook extending slightly inwardly of the sinker at the largest end of the bore so that the sinker will serve also as a guard and a holder for the hook 7 under such conditions.

It is thought that a clear understanding of the construction, utility and advantages of an invention of this character will be had without a more detailed description.

Having thus described the invention what is claimed as new is:—

1. A fishing line sinker comprising an elongated substantially hollow pyramidal body having a tapered bore opening through the opposite ends of said body, and a ferrule molded into the body at the smallest end thereof, the length of said sinker being such as to accommodate a fish hook of conventional length, and the bore of the sinker at the largest end of the sinker body being of a diameter to accommodate the barb end of the hook.

2. A fishing line sinker comprising an elongated substantially hollow pyramidal body having a tapered bore opening through the opposite ends of said body, and a ferrule molded into the body at the smallest end thereof, the length of said sinker being such as to accommodate a fish hook of conventional length, and the bore of the sinker at the largest end of the sinker body being of a diameter to accommodate the barb end of the hook, and said ferrule being provided with beads at opposite ends thereof, the bead at one end of the ferrule being exteriorly of the body, and the bead at the opposite end of the ferrule being interiorly of the sinker body and providing an abutment for a swivel connecting an end of a fish line trained through said ferrule with the hook-carrying lead line.

3. A fish line sinker comprising an elongated sinker body having a bore extending from end to end thereof and tapering towards one end, and a ferrule mounted in the bore at the smallest end thereof to freely receive a fishing line attached to a swivel of a fish hook leader, said ferrule providing a stop to be engaged by the swivel for limiting the movement of the body towards a hook attached to said leader and permitting the fishing line to move freely through said body when the hook is pulled by a fish.

JOSEPH A. STEFAN.